United States Patent
Kim

(10) Patent No.: US 10,055,233 B2
(45) Date of Patent: Aug. 21, 2018

(54) MULTIMEDIA TERMINAL FOR VEHICLE AND DATA PROCESSING METHOD THEREOF

(71) Applicant: HYUNDAI MOTOR COMPANY, Seoul (KR)

(72) Inventor: Dae Sik Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 92 days.

(21) Appl. No.: 14/940,100

(22) Filed: Nov. 12, 2015

(65) Prior Publication Data
US 2016/0210157 A1    Jul. 21, 2016

(30) Foreign Application Priority Data
Jan. 21, 2015   (KR) .................. 10-2015-0009983

(51) Int. Cl.
*G06F 9/44*     (2018.01)
*G06F 1/32*     (2006.01)
(Continued)

(52) U.S. Cl.
CPC ........ *G06F 9/4406* (2013.01); *B60L 11/1809* (2013.01); *G06F 1/3296* (2013.01);
(Continued)

(58) Field of Classification Search
CPC .. G06F 9/4406; G06F 9/45545; G06F 9/4401; G06F 1/3296; G06F 9/4418; G06F 11/1417; B60L 11/1809
See application file for complete search history.

(56) References Cited

U.S. PATENT DOCUMENTS 6,374,353 B1 *  4/2002  Settsu .................. G06F 9/4406
                                                        713/2
7,966,506 B2 *  6/2011  Bodas .................. G06F 1/3203
                                                        713/322
(Continued)

FOREIGN PATENT DOCUMENTS

JP     07-044494 A      2/1995
JP    2009-284023 A    12/2009
(Continued)

OTHER PUBLICATIONS

Office Action issued in corresponding Korean Patent Application No. 10-2015-0009983, dated Mar. 18, 2016.

*Primary Examiner* — Nitin C Patel
*Assistant Examiner* — Kevin M Stewart
(74) *Attorney, Agent, or Firm* — McDermott Will & Emery LLP

(57) ABSTRACT

A data processing method of a multimedia terminal for a vehicle includes booting, by an integration micom, a guest operation system according to a wakeup command received from a modem included in the multimedia terminal for the vehicle. The integration micom is physically independent from a main central processing unit (CPU). The method further includes interpreting a remote control command received from the modem by middleware executed by the guest operation system, and performing, by the multimedia terminal for the vehicle, a control operation according to the remote control command. A multimedia terminal for a vehicle is also disclosed.

18 Claims, 7 Drawing Sheets

(51) Int. Cl.
 B60L 11/18 (2006.01)
 G06F 9/4401 (2018.01)
 G06F 9/455 (2018.01)
 G06F 11/14 (2006.01)
(52) U.S. Cl.
 CPC ........ G06F 9/4401 (2013.01); G06F 9/45545 (2013.01); G06F 9/4418 (2013.01); *G06F 11/1417* (2013.01)

(56) References Cited

U.S. PATENT DOCUMENTS

| | | | | |
|---|---|---|---|---|
| 2006/0041776 | A1* | 2/2006 | Agrawal | G06F 9/44505 714/2 |
| 2006/0277400 | A1* | 12/2006 | Veen | G06F 9/4411 713/1 |
| 2008/0077786 | A1* | 3/2008 | Pierce | G06F 9/4405 713/2 |
| 2011/0113219 | A1* | 5/2011 | Golshan | G06F 9/44505 712/30 |
| 2011/0173610 | A1* | 7/2011 | Shimogawa | G06F 9/45533 718/1 |
| 2012/0246733 | A1* | 9/2012 | Schafer | G08G 1/0104 726/26 |
| 2012/0256763 | A1* | 10/2012 | Johnson | G08C 17/02 340/870.07 |
| 2014/0277828 | A1* | 9/2014 | Bullister | G07C 5/008 701/1 |
| 2014/0309870 | A1* | 10/2014 | Ricci | H04W 48/04 701/36 |
| 2015/0323983 | A1* | 11/2015 | Hobson | G06F 1/3203 713/323 |
| 2016/0328272 | A1* | 11/2016 | Ahmed | G06F 9/4443 |
| 2016/0371094 | A1* | 12/2016 | Higashiyama | G06F 9/445 |

FOREIGN PATENT DOCUMENTS

| | | |
|---|---|---|
| KR | 10-0667056 B1 | 1/2007 |
| KR | 10-2007-0075162 A | 7/2007 |
| KR | 10-2007-0089413 A | 8/2007 |
| KR | 10-0766427 B1 | 10/2007 |
| KR | 10-2009-0061224 A | 6/2009 |
| KR | 10-2010-0079496 A | 7/2010 |
| KR | 10-2012-0025229 A | 3/2012 |
| KR | 10-2014-0059665 A | 5/2014 |

* cited by examiner

MULTIMEDIA TERMINAL FOR VEHICLE AND DATA PROCESSING METHOD THEREOF

CROSS REFERENCE TO RELATED APPLICATION

This application claims the benefit of priority to Korean Patent Application No. 10-2015-0009983, filed on Jan. 21, 2015, which is hereby incorporated by reference as if fully set forth herein.

TECHNICAL FIELD

The present disclosure relates to a method of remotely controlling a vehicle, and more particularly, to a multimedia terminal for a vehicle that executes a remote control command from an external source and a data processing method thereof.

BACKGROUND

In general, when a vehicle is stopped and parked at a specific place and deviates from user management, the user has difficulty in further using the vehicle due to an external environment such as temperature, weather, and so on and the uniqueness of the vehicle (e.g., an electric vehicle). To overcome this, research has been actively conducted into a vehicle remote control system by which even a user far away from a vehicle can maintain and repair the vehicle.

For example, a vehicle needs to be maintained and repaired when the vehicle is exposed to an external environment such as very high or high temperature for long time or when an electric vehicle needs to be pre-charged.

A vehicle remote control system includes a vehicle controller that directly maintains and repairs a vehicle and a multimedia terminal that relays communication with a user terminal owned by a user. Booting and processing speed of a general multimedia terminal is lower than communication processing speed of the user terminal, which does not meet user requirement for rapid remote control of a vehicle.

SUMMARY

Accordingly, the present disclosure is directed to a multimedia terminal for a vehicle and a data processing method thereof that substantially obviates one or more problems due to limitations and disadvantages of the related art.

An object of the present disclosure is to provide a multimedia terminal for a vehicle for rapid remote control of the vehicle and a data processing method thereof.

Additional advantages, objects, and features of the inventive concept will be set forth in part in the description which follows and in part will become apparent to those having ordinary skill in the art upon examination of the following or may be learned from practice of the inventive concept. The objectives and other advantages of the inventive concept may be realized and attained by the structure particularly pointed out in the written description and claims hereof as well as the appended drawings.

To achieve these objects and other advantages and in accordance with the purpose of the inventive concept, as embodied and broadly described herein, a data processing method of a multimedia terminal for a vehicle includes booting, by an integration micom, a guest operating system according to a wakeup command received from a modem included in the multimedia terminal for the vehicle. The integration micom may be physically independent from a main central processing unit (CPU). The method may further include interpreting a remote control command received from the modem by middleware executed by the guest operating system, and performing, by the multimedia terminal for the vehicle, a control operation according to the remote control command.

In certain embodiments, the interpreting may be completed before booting of a main CPU, by a host operating system, is begun.

In certain embodiments, when the remote control command is a command for controlling a vehicle controller, the performing may include: powering on the vehicle controller; controlling the vehicle controller to perform a charging or conditioning operation corresponding to the remote control command; and powering off the vehicle controller.

In certain embodiments, when the remote control command is a command for controlling the main CPU, the performing may include: booting the main CPU by a host operating system; controlling the main CPU to perform a service operation corresponding to the remote control command; and powering off the main CPU.

In certain embodiments, power of the main CPU and power of the integration micom may be independently controlled.

In certain embodiments, the method may further include: interpreting, to a format of data capable of being transmitted to the modem, resulting data pertaining to a result obtained by performing the control operation transmitting the interpreted resulting data to the modem; and powering off the main CPU and the integration micom and allowing the modem to enter a sleep mode.

In certain embodiments, the guest operating system may share hardware of the multimedia terminal for the vehicle with a host operating system using a hypervisor as a software virtual platform.

In certain embodiments, the guest operating system may be a real time operating system; and the main CPU and the integration micom may be included in one chip.

In another aspect of the present inventive concept, a data processing method of a multimedia terminal for a vehicle includes booting, by an integration micom, a guest operating system according to a wakeup command received from a vehicle controller included in the multimedia terminal for the vehicle. The integration micom may be physically independent from a main central processing unit (CPU). The method may further include interpreting a remote control command received from the vehicle controller by middleware executed by the guest operating system, and performing, by the multimedia terminal for the vehicle, a control operation according to the remote control command.

In certain embodiments, the interpreting may be completed before booting of a main CPU, by a host operating system, is begun.

In certain embodiments, when the remote control command is a command for controlling a vehicle controller, the performing may include: controlling the vehicle controller to perform a charging or conditioning operation corresponding to the remote control command; and powering off the vehicle controller.

In certain embodiments, power of the main CPU and power of the integration micom may be independently controlled.

In certain embodiments, the method may further include: interpreting, to format of data capable of being transmitted to a modem, resulting data pertaining to a result obtained by performing the control operation; transmitting the interpreted resulting data to the modem; and powering off the main CPU and the integration micom and allowing the modem to enter a sleep mode.

In certain embodiments, the guest operating system may share hardware of the multimedia terminal for the vehicle with a host operating system using a hypervisor as a software virtual platform.

In certain embodiments, the guest operating system may be a real time operating system; and the main CPU and the integration micom may be included in one chip.

In another aspect of the present inventive concept, a multimedia terminal for a vehicle includes a modem configured to receive a wakeup command and a remote control command from a remote center outside the multimedia terminal for the vehicle. An integration micom is configured to boot a guest operating system according to the wakeup command. The integration micom includes middleware executed by the guest operating system to interpret the remote control command, and may be configured to be physically independent from a main central processing unit (CPU). The multimedia terminal may be configured to perform a control operation according to the remote control command.

In another aspect of the present inventive concept, a multimedia terminal for a vehicle includes an integration micom configured to boot a guest operating system according to a wakeup command received from a vehicle controller, comprising middleware executed by the guest operating system to interpret a remote control command received from the vehicle controller, and configured to be physically independent from a main central processing unit (CPU). The multimedia terminal may be configured to perform a control operation according to the remote control command.

It is to be understood that both the foregoing general description and the following detailed description of the present inventive concept are exemplary and explanatory and are intended to provide further explanation of the inventive concept as claimed.

BRIEF DESCRIPTION OF THE DRAWINGS

The accompanying drawings, which are included to provide a further understanding of the disclosure and are incorporated in and constitute a part of this application, illustrate embodiment(s) of the inventive concept and together with the description serve to explain principles of the inventive concept. In the drawings.

DETAILED DESCRIPTION

Hereinafter, a multimedia terminal for a vehicle will now be made in detail to the preferred embodiments of the present inventive concept, examples of which are illustrated in the accompanying drawings. In addition, the suffixes "module" and "unit" of elements herein are used for convenience of description and thus can be used interchangeably and do not have any distinguishable meanings or functions.

Figure 1:
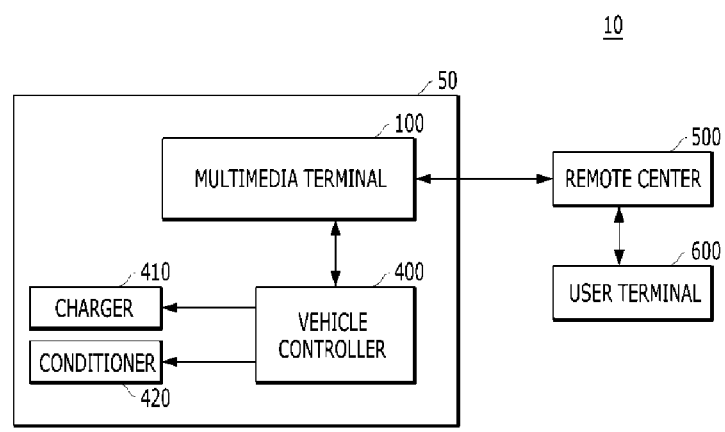
FIG. 1 is a schematic block diagram of a vehicle remote control system according to an embodiment of the present inventive concept.

FIG. 1 is a schematic block diagram of a vehicle remote control system 10 according to an embodiment of the present inventive concept.

Referring to FIG. 1, in certain embodiments, the vehicle remote control system 10 may include a vehicle 50, a remote center 500, and a user terminal 600.

The vehicle 50 shown in FIG. 1 is assumed to be an electric vehicle that needs to be charged for driving but the scope of the present inventive concept is not limited thereto. Thus, the vehicle 50 may be embodied as a vehicle that uses general fuel (e.g., petro, diesel, etc.).

In certain embodiments, the vehicle 50 may include a multimedia terminal 100, a vehicle controller 400, a charger 410, and a conditioner 420.

In certain embodiments, the multimedia terminal 100 may be a terminal that can wirelessly communicate with the remote center 500 and can communicate with the vehicle controller 400 by wire. For example, in certain embodiments, the wireless communication may refer to communication using a mobile communication network of a short message service (SMS) or transfer control/Internet protocol (TCP/IP). In certain embodiments, the wired communication may refer to communication using a controller area network (CAN).

In certain embodiments, the multimedia terminal 100 may receive a request for remote control from the remote center 500 and control the vehicle controller 400 or directly perform an operation according to the request. In certain embodiments, the multimedia terminal 100 may collect the result of the operation according to the request and transmit the result to the remote center 500.

In certain embodiments, the multimedia terminal 100 may receive a request for remote control from the vehicle controller 400 and control the vehicle controller 400. The multimedia terminal 100 may collect the result of the operation according to the request and transmit the result to the remote center 500.

In certain embodiments, the remote control method of the vehicle 50 may include a center connection mode and a vehicle self mode. The center connection mode refers to a mode in which a remote control operation is initiated according to a request from the remote center 500 and the vehicle self mode refers to a mode in which a remote control operation is initiated according to the determination result of the vehicle controller 400 itself.

In certain embodiments, the multimedia terminal 100 may be embodied as an audio, video, navigation (AVN) player, a telematics terminal, or a cluster.

In certain embodiments, the vehicle controller 400 may control the charger 410 and the conditioner 420 according to control of the multimedia terminal 100 and transmit data according to the control result to the multimedia terminal 100.

In certain embodiments, the vehicle controller 400 may determine whether a charging or conditioning time period is reached using pre-stored charging or conditioning setting information for the vehicle self mode and a counting result of a timer inside the vehicle controller 400 and transmit a request for remote control to the multimedia terminal 100 according to the determination result. In certain embodiments, the charging or conditioning setting information may be, for example, information for charging a vehicle every morning at 7 am until the vehicle is completely charged or information for operating an air conditioner or a heater until internal temperature of the vehicle 50 reaches setting temperature.

In certain embodiments, the vehicle controller 400 may control the charger 410 to charge a battery included in the vehicle 50.

In certain embodiments, the conditioner 420 may change a conditioning state (temperature, humidity, etc.) of the vehicle 50 under control of the vehicle controller 400.

In certain embodiments, the remote center 500 may receive a request for remote control from the user terminal 600 and transmit the request to the multimedia terminal 100. In addition, in certain embodiments, the remote center 500 may receive the result of an operation of the request and transmit the result to the user terminal 600. In some embodiments, the remote center 500 may be embodied as a telematics center.

In certain embodiments, communication between the remote center 500 and the user terminal 600 may be performed via the aforementioned wireless communication.

In certain embodiments, the user terminal 600 may generate a request for remote control according to a user request in the center connection mode, transmit the request to the remote center 500, receive the result of an operation according to the request, and provide the result to the user. In some embodiments, the user terminal 600 may be embodied as a tablet, a cellular phone such as a smartphone, or a computer such as a personal computer (PC), a notebook computer, etc.

Figure 2:
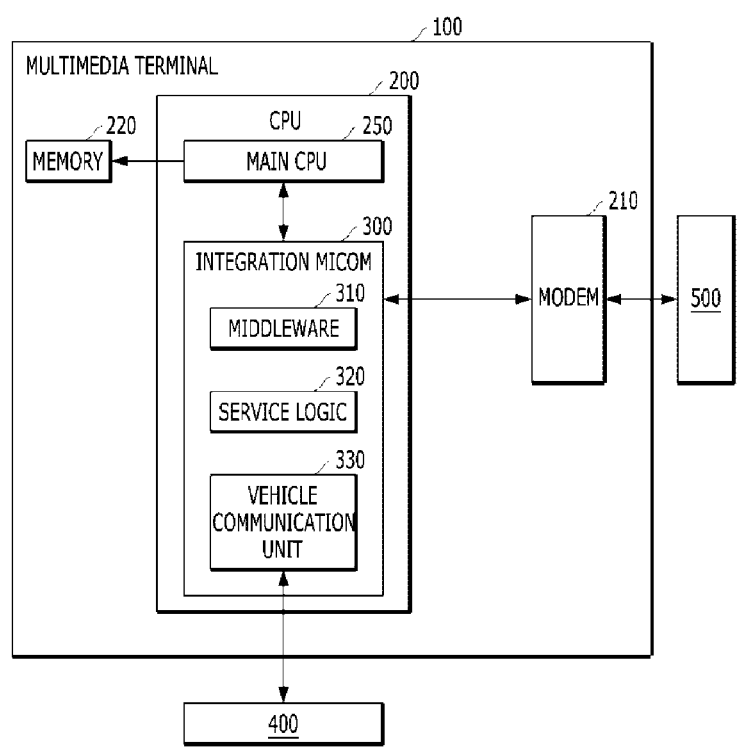
FIG. 2 is a block diagram illustrating the multimedia terminal illustrated in FIG. 1 in detail.

FIG. 2 is a block diagram illustrating the multimedia terminal 100 illustrated in FIG. 1 in detail.

Referring to FIGS. 1 and 2, the multimedia terminal 100 may include a central processing unit (CPU) 200, a modem 210, and a memory 220.

The CPU 200 may include a main CPU 250 and an integration micom 300. In certain embodiments, each of the main CPU 250 and the integration micom 300 may a physically and functionally independent processor. The CPU 200 may be embodied as one semiconductor chip, and for example, each of the main CPU 250 and the integration micom 300 may be an independent core of the CPU 200, but is not limited thereto.

In certain embodiments, the main CPU 250 may control an overall operation of the multimedia terminal 100. For example, when the main CPU 250 is embodied as AVN, the main CPU 250 may control hardware such as a display, a touchscreen, speaker, etc. and execute a navigation program.

In certain embodiments, the main CPU 250 may store data received from the integration micom 300.

In certain embodiments, the integration micom 300 may include a middleware 310, a service logic 320, and a vehicle communication unit 330. In certain embodiments, the integration micom 300 may bi-directionally communicate with the vehicle controller 400 and, in certain embodiments, may bi-directionally communicate with the remote center 500 through the modem 210. Here, the meaning of integration will be described below with reference to FIG. 3.

The integration micom 300 may receive a wakeup command or a remote control command from the vehicle controller 400 or the remote center 500 and control an operation corresponding to the commands. The wakeup command is a command for requesting the integration micom 300 to be booted to interpret and process the remote control command. The remote control command is detailed information for controlling the multimedia terminal 100 or the vehicle controller 400.

The middleware 310 may interpret data received from the vehicle controller 400 or the remote center 500 outside the integration micom 300 as data recognizable by the integration micom 300 or interpret data of the integration micom 300 as data recognizable by the vehicle controller 400 or the remote center 500. That is, the middleware 310 is software that performs a function of an interpreter that converts a protocol between heterogeneous devices.

In certain embodiments, the service logic 320 may interpret and process a command corresponding to the data received from the vehicle controller 400 or the remote center 500, may directly manage power of the components 210, 220, 250, and 300 inside the multimedia terminal 100 through a power module (not shown), and may request the vehicle controller 400 to be powered on or off.

In addition, in certain embodiments, the service logic 320 may collect data generated during an operation of the integration micom 300 and request the main CPU 250 to store the data in the memory 220 or transmit the data interpreted by the middleware 310 to the remote center 500 through the modem 210.

In certain embodiments, the vehicle communication unit 330 may transmit and receive data to and from the vehicle controller 400 through a CAN method (e.g., B-CAN, MM-CAN, and C-CAN).

In certain embodiments, the modem 210 may relay bi-directional communication between the CPU 200 and the remote center 500.

In certain embodiments, the memory 220 may store a booting file required for an operation of the CPU 200, program data, and data generated by the CPU 200. The memory 220 may be embodied as a non-volatile memory, but is not limited thereto.

Figure 3:
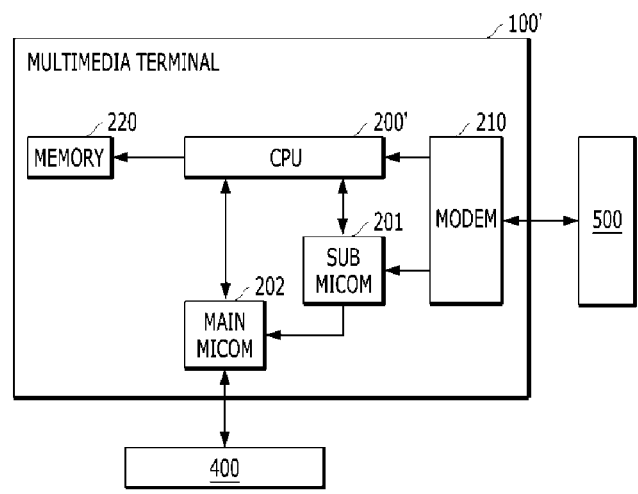
FIG. 3 is a block diagram illustrating a multimedia terminal according to Comparative Example of the present disclosure.

FIG. 3 is a block diagram illustrating a multimedia terminal 100' according to Comparative Example of the present disclosure.

Referring to FIGS. 2 and 3, the multimedia terminal 100' includes a CPU 200', a sub micom 201, a main micom 202, the modem 210, and the memory 220. The modem 210 and the memory 220 are substantially the same as the modem 210 and the memory 220 illustrated in FIG. 2, respectively, and for convenience of description, the multimedia terminal 100' will be described in terms of a difference from the multimedia terminal 100 of FIG. 2.

The CPU 200', the sub micom 201, and the main micom 202 are embodied as respective separate semiconductor chips.

The CPU 200' interprets and processes commands executed by the middleware 310 and the service logic 320 in addition to a function performed by the main CPU 250.

Here, the multimedia terminal 100' will be described on the assumption that the multimedia terminal 100' receives a wakeup command and a remote control command for controlling the vehicle controller 400 from the remote center 500.

Upon receiving the wakeup command from the remote center 500, the modem 210 transmits the wakeup command to the sub micom 201. The sub micom 201 that receives the wakeup command requests booting of the CPU 200' and the main micom 202.

The CPU 200' receives the remote control command from the modem 210 after completing booting, interprets the remote control command, and determines whether the remote control command is a command for controlling the vehicle controller 400 as the interpretation result. As the determination result, when the remote control command is the command for controlling the vehicle controller 400, the CPU 200' requests wakeup of the vehicle controller 400 to the main micom 202.

The main micom 202 powers-on the vehicle controller 400 and transmits information for remote control to the vehicle controller 400. The main micom 202 receives the result for remote control from the vehicle controller 400, transmits the result to the CPU 200', completes the remote control, and then powers off the vehicle controller 400.

The CPU 200' stores the received result for remote control in the memory 220, interprets the result as data recognizable by the remote center 500, and transmits the data to the remote center 500 through the modem 210.

That is, the wakeup command received from outside the multimedia terminal 100' is recognized by the sub micom 201 that one-way communicates with the CPU 200' and requests the CPU 200' to be booted and to interpret and process the remote control command.

Accordingly, the multimedia terminal 100' may interpret and process the remote control command only after booting of the CPU 200' is completed. Booting of the CPU 200' takes longer than the sub micom 201, the main micom 202, or the integration micom 300. That is, as processing of the remote control command from the remote center 500 is delayed by as much as booting time of the CPU 200', overall remote control time is lengthened.

On the other hand, the multimedia terminal 100 illustrated in FIG. 2 includes the integration micom 300 independent from the main CPU 250, and thus interpretation and processing according to an external remote control request can be performed even if the main CPU 250 with low booting speed and high power consumption is not booted.

In addition, the multimedia terminal 100' has problem in that an interworking process between the two micoms 201 and 202 and the CPU 200' is complex and all of the two micoms 201 and 202 and the CPU 200' need to be driven during a remote control operation, thereby increasing power consumption.

However, the multimedia terminal 100 illustrated in FIG. 2 includes the main CPU 250 and the integration micom 300 in the chip 200 as one chip and performs a remote control operation, and thus an interworking operation between components may be simplified and power consumption may be reduced compared with the multimedia terminal 100 in which three chips need to be driven.

Since the sub micom 201 can perform one-way communication, it is difficult to request wakeup to a side of the multimedia terminal 100 from a side of the vehicle controller 400. However, the multimedia terminal 100 illustrated in FIG. 2 may include the integration micom 300 that can bi-directionally communicate with the modem 210, the main CPU 250, and the vehicle controller 400 so as to efficiently process a request in a vehicle self mode or a center connection mode.

Here, the meaning of integration of the integration micom 300 includes all of some functions of the CPU 200' and functions of the two micoms 201 and 202 and refers to simplification of a remote control process.

Figure 4:
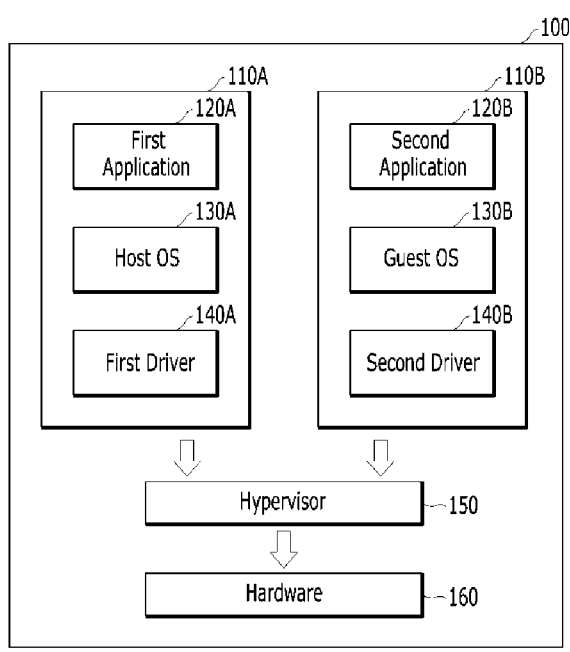
FIG. 4 is a block diagram for explanation of layers for an operation of the multimedia terminal illustrated in FIG. 2.

FIG. 4 is a block diagram for explanation of layers for an operation of the multimedia terminal 100 illustrated in FIG. 2.

Referring to FIGS. 2 and 4, the multimedia terminal 100 may include a first layer 110A, a second layer 110B, a hypervisor 150, and hardware 160. In certain embodiments, there may be a hypervisor 150 and hardware 160 for each respective layer. In other embodiments, there is one hypervisor 150 for multiple layers.

The first layer 110A may include a first application 120A, a host OS 130A, and a first driver 140A.

The first application 120A may be a program executed on the host OS 130A.

The host OS 130A refers to an OS driven by the main CPU 250 and may control the hardware 160 through the first driver 140A.

The first driver 140A controls the hardware 160 according to control of the host OS 130A and accesses the hardware 160 according to control of the hypervisor 150.

The second layer 110B may include the second application 120B, a guest OS 130B, and a second driver 140B.

The second application 120B may be a program executed on the guest OS 130B. For example, the second application 120B may include the middleware 310 and the service logic 320 illustrated in FIG. 2.

In certain embodiments, the guest OS 130B may refer to an OS driven by the integration micom 300 and control the hardware 160 through the second driver 140B. In certain embodiments, the guest OS 130B may be a real time operating system that is embodied to embody even occurrence and even processing in real time.

The second driver 140B controls the hardware 160 according to control of the guest OS 130B and accesses the hardware 160 according to control of the hypervisor 150.

The hypervisor 150 is a software virtual platform between the hardware 160 and the OSs 130A and 130B that can drive a plurality of OSs in one system. That is, the hypervisor 150 may prevent collision for access to the hardware 160 between simultaneously driven OSs according to, for example, a predetermined priority order or a type of a command to be processed.

The hardware 160 refers to a shared resource that can be accessed by the OSs 130A and 130B and includes a shared source, for example, the CPU 200, the memory 220, or the like.

That is, even if the main CPU 250 and the integration micom 300 that are embodied as one chip is booted by different OSs 130A and 130B, a remote control operation can be performed without collision according to an operation of the hypervisor 150.

Figure 5:
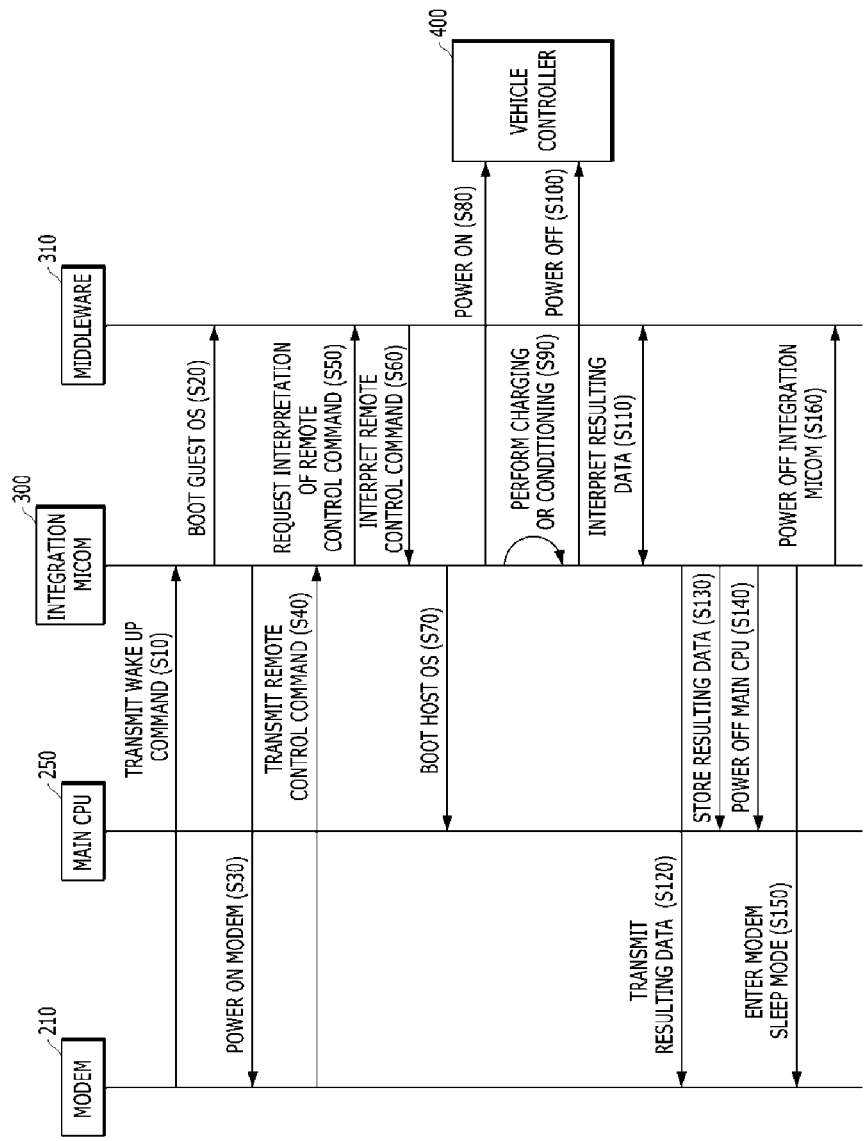
FIG. 5 is a flowchart for explanation of an operation of the multimedia terminal illustrated in FIG. 2 in a center connection mode.

FIG. 5 is a flowchart for explanation of an operation of the multimedia terminal 100 in the center connection mode illustrated in FIG. 2.

Referring to FIGS. 1, 2, and 5, in a center connection mode in which a user requests remote control of the vehicle 50, upon receiving a SMS type wakeup command from the remote center 500, the modem 210 may transmit the wakeup command to the integration micom 300 (S10). In this case, in certain embodiments, the modem 210 may receive the wakeup command and may operate in a sleep mode as a standby state for performing a minimum operation for transmission to the integration micom 300.

In certain embodiments, the integration micom 300 may boot the guest OS 130B according to the wakeup command and execute the middleware 310 (S20).

In certain embodiments, the integration micom 300 may power on the modem 210 (S30).

In certain embodiments, when the modem 210 is powered on and then receives a TCP/IP type of remote control command from the remote center 500, the modem 210 may transmit the remote control command to the integration micom 300 (S40).

Upon receiving the remote control command, the integration micom 300 may request the middleware 310 to interpret the remote control command (S50).

In certain embodiments, the middleware 310 may interpret the remote control command and provide the interpreted remote control command to the service logic 320 (S60).

In certain embodiments, the service logic 320 may determine whether the interpreted remote control command is a command for remotely controlling the vehicle controller 400 or a command for remotely controlling the multimedia terminal 100.

In certain embodiments, when the interpreted remote control command is the command for remotely controlling the vehicle controller 400, the service logic 320 may control the main CPU 250, which can store data about the remote control result, to be booted based on the host OS 130A (S70).

In certain embodiments, the integration micom 300 may power on the vehicle controller 400 (S80).

In certain embodiments, the integration micom 300 may transmit the interpreted remote control command to the vehicle controller 400 and control the vehicle controller 400 to perform a charging or conditioning operation corresponding to the interpreted remote control command (S90). When the charging or conditioning operation is completed, the integration micom 300 may power off the vehicle controller 400 (S100).

In certain embodiments, the integration micom 300 may interpret data according to resulting data according to the completed charging or conditioning operation to format (e.g., TCP/IP) of data transmitted from the modem 210 (S110).

In certain embodiments, the integration micom 300 may transmit the resulting data to the remote center 500 through the modem 210 (S120).

In certain embodiments, the integration micom 300 may request the main CPU 250 that is completely booted to store the resulting data in the memory 220 (S130).

In certain embodiments, when the resulting data is completely stored, the integration micom 300 may power off the main CPU 250 (S140).

In certain embodiments, the integration micom 300 may allow the modem 210 to enter the sleep mode (S150).

In certain embodiments, the integration micom 300 may power off the integration micom 300 itself (S160).

Figure 6:
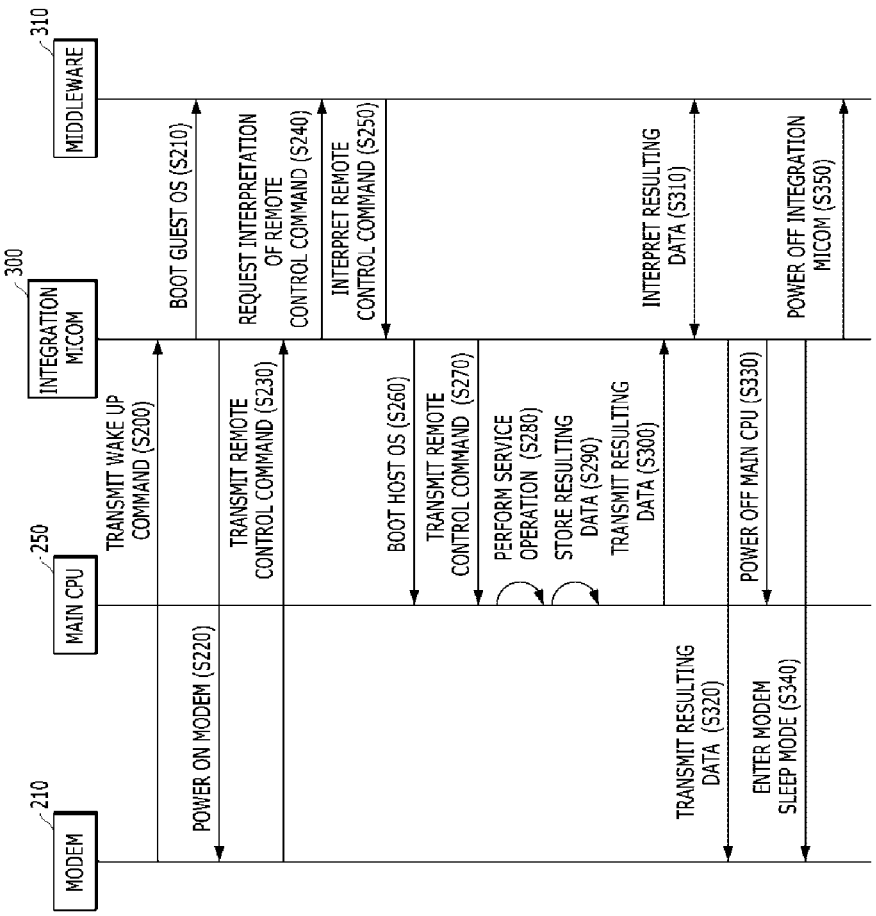
FIG. 6 is a flowchart for explanation of another embodiment of an operation of the multimedia terminal in the center connection mode illustrated in FIG. 2.

FIG. 6 is a flowchart for explanation of an operation of the multimedia terminal 100 in the center connection mode illustrated in FIG. 2.

Referring to FIGS. 1, 2, 5, and 6, operations S200 to S250 illustrated in FIG. 6 are substantially the same as operations S10 to S60 illustrated in FIG. 5, respectively, and thus for convenience of description, a repeated description will be omitted.

In certain embodiments, the service logic 320 may determine whether the interpreted remote control command is a command for remotely controlling the vehicle controller 400 or a command for remotely controlling the multimedia terminal 100 itself.

When the interpreted remote control command is the command for remotely controlling the multimedia terminal 100 itself, the service logic 320 may control the main CPU 250 to be booted by the host OS 130A (S260).

When booting of the main CPU 250 is completed, the integration micom 300 may transmit the interpreted remote control command to the main CPU 250 (S270).

In certain embodiments, the main CPU 250 may perform a service operation (e.g., transmission of current vehicle position on GPS) corresponding to the interpreted remote control command (S280).

In certain embodiments, the main CPU 250 may store resulting data as the result of the service operation in the memory 220 (S290).

In certain embodiments, the main CPU 250 may transmit the resulting data to the integration micom 300 (S300).

Subsequent operations S310 to S350 are substantially the same as operations S110, S120, S140, S150, and S160 of FIG. 5, respectively.

Figure 7:
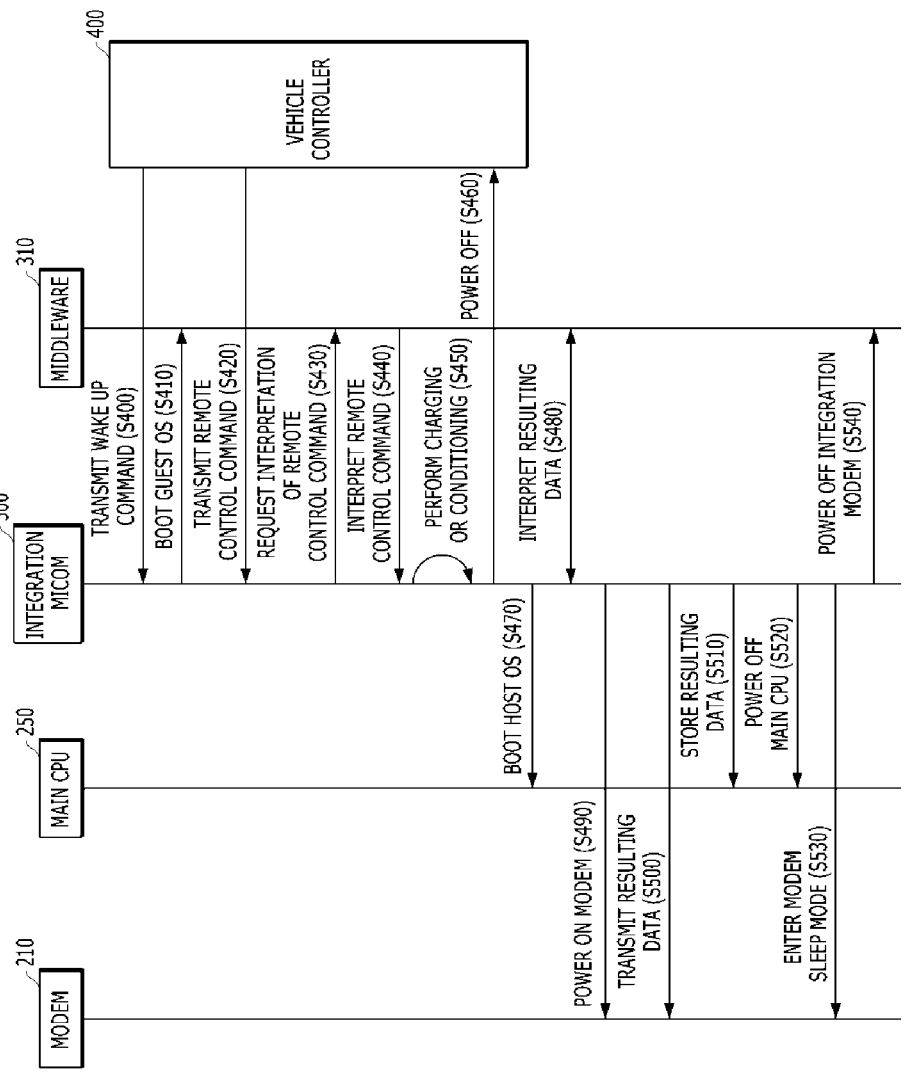
FIG. 7 is a flowchart for explanation of an operation of a multimedia terminal in a vehicle self mode illustrated in FIG. 2 according to another embodiment of the present inventive concept.

FIG. 7 is a flowchart for explanation of an operation of the multimedia terminal 100, illustrated in FIG. 2, in the vehicle self mode according to an embodiment of the present inventive concept.

Referring to FIGS. 1, 2, 5, and 7, in a vehicle self mode in which a remote control operation is initiated according to the determination result of the vehicle controller 400 itself, the vehicle controller 400 may transmit a wakeup command to the integration micom 300 (S400).

In certain embodiments, the integration micom 300 may boot the guest OS 130B according to the wakeup command and execute the middleware 310 (S410).

In certain embodiments, when booting by the integration micom 300 is completed, the vehicle controller 400 may transmit a remote control command to the integration micom 300 (S420).

In certain embodiments, upon receiving the remote control command, the integration micom 300 may request the middleware 310 to interpret the remote control command (S430).

In certain embodiments, the middleware 310 may interpret the remote control command and provide the interpreted remote control command to the service logic 320 (S440).

In certain embodiments, the integration micom 300 may transmit the interpreted remote control command to the vehicle controller 400 and control the vehicle controller 400 to perform a charging or conditioning operation corresponding to the interpreted remote control command (S450). When the charging or conditioning operation is completed, the integration micom 300 may power off the vehicle controller 400 (S460).

In certain embodiments, the service logic 320 may control the main CPU 250 that stores data about the remote control result, to be booted by the host OS 130A (S470).

In certain embodiments, the integration micom 300 may interpret resulting data about the completed charging or conditioning operation to format (e.g., TCP/IP) of data transmitted from the modem 210 (S480).

In certain embodiments, the integration micom 300 may power on the modem 210 in order to transmit the resulting data (S490).

Subsequent operations S500 to 540 may be substantially the same as operations S120 to S160 of FIG. 5, respectively.

Accordingly, the integration micom 300 may directly perform interpretation and processing according to an external remote control request before booting of the main CPU 250 is begun or completed, and thus rapid remote control is possible, thereby reducing power consumption.

The aforementioned multimedia terminal for a vehicle and a data processing method thereof are not limited to the configurations and methods of the above-described embodiments. That is, the above-described embodiments may be partially or wholly combined to make various modifications.

Interpretation and processing according to an external remote control request can be performed thorough the multimedia terminal for a vehicle related to at least one of the aforementioned embodiments of the present inventive concept even if a CPU is not booted, thereby increasing processing speed of the remote control request.

In addition, an interworking between components that perform the remote control request can be simplified and power consumption can be reduced.

The multimedia terminal may include an integration micom that can perform bi-directional communication so as to efficiently process a request in a vehicle self mode or a center connection mode.

It will be apparent to those skilled in the art that various modifications and variations can be made in the present inventive concept without departing from the spirit or scope of the inventive concept. Thus, it is intended that the present inventive concept covers modifications and variations of this disclosure provided they come within the scope of the appended claims and their equivalents.

What is claimed is:

1. A multimedia terminal for a vehicle, comprising:
   a modem configured to receive a wakeup command and a remote control command from a remote center outside the multimedia terminal for the vehicle;
   an integration micom configured to boot a guest operating system according to the wakeup command received by the modem, the integration micom comprising a middleware executed by the guest operating system; and
   a main central processing unit (CPU) configured to be physically independent from the integration micom,
   wherein upon receiving the remote control command from the modem, the integration micom is configured to request the middleware to interpret the received remote control command,
   wherein after the received remote control command is interpreted by the middleware, the integration micom is configured to control the main CPU to be booted based on a host operating system, and
   wherein the multimedia terminal is configured to perform a control operation according to the remote control command.

2. The multimedia terminal according to claim 1, wherein when the remote control command is a command for controlling a vehicle controller, the integration micom is configured to power on the vehicle controller, control the vehicle controller to perform a charging or conditioning operation corresponding to the remote control command, and power off the vehicle controller.

3. The multimedia terminal according to claim 1, wherein when the remote control command is a command for controlling the main CPU, the integration micom is configured to boot the main CPU by the host operating system, control the main CPU to perform a service operation corresponding to the remote control command, and power off the main CPU.

4. The multimedia terminal according to claim 1, wherein power of the main CPU and power of the integration micom are independently controlled.

5. The multimedia terminal according to claim 1, wherein the middleware is configured to interpret resulting data pertaining to a result obtained by performing the control operation to a format of data capable of being transmitted to the modem, transmit the interpreted resulting data to the modem, and power off the main CPU and the integration micom and allow the modem to enter a sleep mode.

6. The multimedia terminal according to claim 1, wherein the guest operating system is configured to share hardware of the multimedia terminal for the vehicle with the host operating system using a hypervisor as a software virtual platform.

7. The multimedia terminal according to claim 1, wherein:
   the guest operating system is a real time operating system; and
   the main CPU and the integration micom are included in one chip.

8. A multimedia terminal for a vehicle, comprising:
   A vehicle controller configured to transmit a wakeup command and a remote control command;
   an integration micom configured to boot a guest operating system according to the wakeup command received from the vehicle controller, the integration micom comprising a middleware executed by the guest operating system; and
   a main central processing unit (CPU) configured to be physically independent from the integration micom,
   wherein upon receiving the remote control command from the vehicle controller, the integration micom is configured to request the middleware to interpret the received remote control command,
   wherein after the received the remote control command is interpreted by the middleware, the integration micom is configured to control the main CPU to be booted based on a host operating system, and
   wherein the multimedia terminal is configured to perform a control operation according to the remote control command.

9. The multimedia terminal according to claim 8, wherein when the remote control command is a command for controlling the vehicle controller, the integration micom is configured to control the vehicle controller to perform a charging or conditioning operation corresponding to the remote control command, and power off the vehicle controller.

10. The multimedia terminal according to claim 8, wherein power of the main CPU and power of the integration micom are independently controlled.

11. The multimedia terminal according to claim 8, wherein the middleware is configured to interpret resulting data pertaining to a result obtained by performing the control operation to a format of data capable of being transmitted to the modem, transmit the interpreted resulting data to the modem, and power off the main CPU and the integration micom and allow the modem to enter a sleep mode.

12. The multimedia terminal according to claim 8, wherein the guest operating system is configured to share hardware of the multimedia terminal for the vehicle with the host operating system using a hypervisor as a software virtual platform.

13. The multimedia terminal according to claim 8, wherein:
   the guest operating system is a real time operating system; and
   the main CPU and the integration micom are included in one chip.

14. The multimedia terminal according to claim 1, wherein the modem in sleep mode is configured to transmit the wakeup command received from the remote center to the integration micom.

15. The multimedia terminal according to claim 14, wherein the integration micom is configured to power on the modem after the integration micom boots the guest operating system.

16. The multimedia terminal according to claim 15, wherein after the modem is powered on, the modem is configured to receive the remote control command from the remote center, and transmit the received remote control command to the integration micom.

17. The multimedia terminal according to claim 8, wherein when booting the guest operating system is completed, the vehicle controller is configured to transmit the remote control command to the integration micom.

18. The multimedia terminal according to claim 1, wherein the wakeup command is for requesting the integration micom to be booted to interpret and process the remote control command.

* * * * *